US008081772B2

(12) United States Patent
Turnbull et al.

(10) Patent No.: US 8,081,772 B2
(45) Date of Patent: Dec. 20, 2011

(54) VEHICULAR MICROPHONE ASSEMBLY USING FRACTIONAL POWER PHASE NORMALIZATION

(75) Inventors: Robert R. Turnbull, Holland, MI (US); Alan R. Watson, Buchanan, MI (US); Michael A. Bryson, Hudsonville, MI (US)

(73) Assignee: Gentex Corporation, Zeeland, MI (US)

(*) Notice: Subject to any disclaimer, the term of this patent is extended or adjusted under 35 U.S.C. 154(b) by 617 days.

(21) Appl. No.: 12/274,749

(22) Filed: Nov. 20, 2008

(65) Prior Publication Data

US 2010/0124339 A1 May 20, 2010

(51) Int. Cl.
*H04B 1/00* (2006.01)
*G10L 21/02* (2006.01)

(52) U.S. Cl. .............. 381/86; 381/58; 381/66; 381/312; 381/357; 381/359; 381/392; 455/345; 455/347; 455/566; 704/216; 704/226; 704/231; 704/E21.004

(58) Field of Classification Search .................... 381/58, 381/66, 86, 312, 357, 359, 392; 455/345, 455/347, 566; 704/216, 226, 231, E21.004
See application file for complete search history.

(56) References Cited

U.S. PATENT DOCUMENTS

| | | | | |
|---|---|---|---|---|
| 4,930,742 | A | 6/1990 | Schofield et al. | |
| 5,566,224 | A | 10/1996 | ul Azam et al. | |
| D402,905 | S | 12/1998 | Kanza et al. | |
| 5,878,353 | A | 3/1999 | ul Azam et al. | |
| 5,940,503 | A | 8/1999 | Palett et al. | |
| 6,023,165 | A | 2/2000 | Damadian et al. | |
| 6,550,949 | B1 | 4/2003 | Bauer et al. | |
| 6,614,911 | B1 | 9/2003 | Watson et al. | |
| 6,882,734 | B2 | 4/2005 | Watson et al. | |
| 7,120,261 | B1 | 10/2006 | Turnbull et al. | |
| 7,930,175 | B2 * | 4/2011 | Haulick et al. | 704/226 |
| 2002/0110256 | A1 | 8/2002 | Watson et al. | |
| 2004/0208334 | A1 | 10/2004 | Bryson et al. | |
| 2007/0274536 | A1 * | 11/2007 | Matsuo | 381/94.3 |
| 2008/0192954 | A1 * | 8/2008 | Honji et al. | 381/86 |
| 2009/0097674 | A1 * | 4/2009 | Watson et al. | 381/86 |

FOREIGN PATENT DOCUMENTS

WO WO 0137519 A2 5/2001

* cited by examiner

*Primary Examiner* — Dao H Nguyen
(74) *Attorney, Agent, or Firm* — Price Heneveld LLP; Scott P. Ryan

(57) ABSTRACT

A triangular microphone assembly (101) for use in a vehicle accessory includes a mirror housing (106) adapted for attachment to the interior of the vehicle. A mirror is disposed in an opening of the mirror housing (106) and a plurality of virtual digital microphones (108*a*, 108*b*, 108*c*) are arranged in a substantially triangular configuration in the mirror housing (106). A digital signal processor (DSP) (537) is used for receiving signals from the plurality of digital microphones (108*a*, 108*b*, 108*c*) such that the digital microphones exhibit directional characteristics for reducing undesirable noise in at least one direction by normalizing the phase of the received signals as a function of signal frequency.

27 Claims, 12 Drawing Sheets

VEHICULAR MICROPHONE ASSEMBLY USING FRACTIONAL POWER PHASE NORMALIZATION

The present invention pertains to microphones and more particularly to a microphone arrangement associated with a vehicle accessory such as a rearview mirror.

BACKGROUND OF THE INVENTION

It has long been desired to provide improved microphone performance in devices such as communication devices and voice recognition devices that operate under a variety of different ambient noise conditions. Communication devices supporting hands-free operation permit the user to communicate through a microphone of a device that is not held by the user. Because of the distance between the user and the microphone, these microphones often detect undesirable noise in addition to the user's speech. The noise is difficult to attenuate and can be troublesome in vehicle applications due to the dynamically varying ambient noise present in the "cab" of the vehicle. For example, bi-directional communication systems such as two-way radios, cellular telephones, satellite telephones, and the like, are used in vehicles, such as automobiles, trains, airplanes and boats. It is preferable for the communication devices of these systems to operate hands-free, such that the user need not hold the device while talking, even in the presence of high ambient noise levels subject to wide dynamic fluctuations.

Bi-directional communication systems typically include both an audio speaker and a microphone. In order to improve hands-free performance in a vehicle communication system, a microphone is typically mounted near the driver's head. For example, a microphone is commonly attached to the vehicle visor or headliner using a fastener such as a clip, adhesive, hook-and-loop fastening tape (such as VELCRO brand fastener) or the like. The audio speaker associated with the communication system is preferably positioned remote from the microphone to assist in minimizing feedback from the audio speaker to the microphone. It is common, for example, for the audio speaker to be located in a vehicle adaptor, such as a hang-up cup or a cigarette lighter plug used to provide energizing power from the vehicle electrical system to the communication device or one or more of the speakers used by the radio. The position of the microphone as well as the microphone arrangement relative to the person speaking will determine the level of the speech signal output by the microphone and may affect the signal-to-noise ratio.

One potential solution to avoid these difficulties is disclosed in U.S. Pat. No. 4,930,742, entitled "REARVIEW MIRROR AND ACCESSORY MOUNT FOR VEHICLES," issued to Schofield et al. on Jun. 5, 1990, which uses a microphone in a mirror mounting support. Although locating the microphone in the mirror support provides the system designer with a microphone location that is known in advance, and avoids the problems associated with mounting the microphone after the vehicle is manufactured, there are a number of disadvantages to such an arrangement. Because the mirror is positioned between the microphone and the person speaking into the microphone, a direct unobstructed path from the user to the microphone is precluded.

U.S. Pat. Nos. 5,940,503, 6,026,162, 5,566,224, 5,878,353, and D402,905 disclose rearview mirror assemblies with a microphone mounted in the bezel of the mirror. None of these patents, however, discloses the use of acoustic ports facing multiple directions nor do they disclose microphone assemblies utilizing more than one microphone transducer.

The disclosed microphone assemblies do not incorporate sufficient noise suppression components to provide output signals with relatively high signal-to-noise ratios. Moreover, they do not provide microphones having a directional sensitivity pattern nor do they have a main lobe directed forward of the housing for attenuating signals originating from the sides of the housing or undesired locations.

It is also highly desirable to provide voice recognition systems in association with vehicle communication systems, and most preferably, such a system would enable hands-free operation. Hands-free operation of a device used in a voice recognition system is a particularly challenging application for microphones since the accuracy of a voice recognition system is dependent upon the quality of the electrical signal representing the user's speech. Conventional hands-free microphones are not able to provide the consistency and predictability of microphone performance needed for such an application in a controlled environment such as an office as well as an uncontrolled and/or noisy environment such as an automobile.

Commonly-assigned U.S. Patent Application Publication Nos. 2004/0208334-A1 and 2002/0110256-A1 and PCT Application Publication No. WO 01/37519 A2, which are herein incorporated by reference, disclose various embodiments of rearview mirror-mounted microphone assemblies. In those embodiments, at least one microphone transducer is typically aimed at the driver of the vehicle. This usually results in the microphone assembly receiving audible voice and noise from all directions within the vehicle cab. Since noise may be introduced into the microphone from anywhere within the vehicle, this raises many types of performance issues when used in certain environments and in combination with digital signal processing circuits. Those skilled in the art will also recognize that there are a number of microphone array placement techniques that are known to offer improved signal-to-noise performance. These techniques typically combine the output of two or more unidirectional microphones to achieve a superior signal in noise conditions.

Prior art FIG. 1 illustrates a side fire four microphone array where a two element side fire array is optimally arranged so as to achieve directional gain from the side of the array. Similarly, FIG. 2 illustrates an end fire four microphone array where the omni-directional microphones are oriented to achieve their best performance from audio coming from the array's end. Although these arrangements work to achieve gain in a predetermined direction, they also work to attenuate noise coming from directions other than those which they are optimized. Using these omni-directional microphone arrangements can achieve results substantially equivalent to that of a first order directional microphone. Thus, it would be necessary to use the equivalent of four omni-directional microphones to achieve the same results as the two directional microphones in these array configurations.

Yet in other applications, it is known to replace two directional units with four omni-directional microphones. However, when processed omni-directional microphones are used to replace directional microphones, there is also an additional advantage of optimized polar patterns and an ability to create first and second order directionality using various frequency combinations. Moreover, greater audio processing is often required since these types of microphone arrangements can have low frequency signal-to-noise problems.

Accordingly, a microphone assembly is contemplated for a vehicle that will provide improved hands-free performance for enabling voice recognition operation when a digital signal processing circuit is utilized. Additionally, the microphone assembly should be directive for use in a specific spatial location within a vehicle while using only a limited number of omni-directional microphone transducers.

BRIEF SUMMARY OF THE INVENTION

According to one embodiment of the present invention, a microphone assembly for use in a vehicle comprises a mirror housing adapted for attachment to the interior of the vehicle, the mirror housing having a back surface generally facing the front of the vehicle and an opening generally facing the rear of the vehicle. A mirror is disposed in the opening of the mirror housing and a plurality of microphone transducers are arranged in a substantially triangular configuration in the mirror housing.

According to other aspects of the invention, an interior rearview mirror assembly for a vehicle comprises a mirror housing adapted for attachment to the interior of the vehicle, the mirror housing having a back surface generally facing the front of the vehicle and an opening generally facing the rear of the vehicle where a mirror is disposed in the opening of the mirror housing. A first microphone transducer, second microphone transducer, and a third microphone transducer are positioned in the mirror housing along the back surface. The first microphone transducer, second microphone transducer, and third microphone transducer are arranged in a substantially triangular configuration for reducing unwanted sound from at least one direction. The first, second, and third microphone transducers form a digital microphone and may use sigma delta modulation.

According to another aspect of the invention, a triangular microphone assembly for use in a vehicle accessory comprises a mirror housing adapted for attachment to the interior of the vehicle where a mirror disposed is in an opening of the mirror housing. A plurality of digital microphones are arranged in a substantially triangular configuration in the mirror housing and a digital signal processor (DSP) is used for receiving signals from the plurality of digital microphones where the digital microphones exhibit directional characteristics for reducing undesirable noise in at least one direction.

According to yet another aspect of the invention, a digital microphone system comprises a plurality of digital microphones each having a digital output signal. A digital signal processor (DSP) is used for receiving each digital output signal and providing a processed digital output signal, and each of the plurality of digital microphones are supplied a supply voltage using a common bus. Each digital microphone includes a transducer, preamplifier, and analog-to-digital (A/D) conversion means providing a Manchester encoded, run length limited or other bit stream.

According to another aspect of the invention, the outputs of two omni-directional, preferably digital, microphone assemblies are processed in pairs of two such that each pair forms a first order directional microphone equivalent. Each microphone assembly can be aimed to align a null with a target location. The processed outputs work to optimize the processed digital signal for steering the null to provide, for that pair, an optimum signal-to-noise content. Using these unique pairs, three of each of the above digital signals can be created where they may be added, by types, forming two summation signals. Preferably, one is devoid of the target area sounds, while the other includes maximum target area sounds and minimum dominant noise. The signal devoid of target area sounds is then used as a reference for a blocking filter. Thus, as long as no target area sounds are present, the signal processing algorithm works to remove all significant noise sources without filtering desired target area sounds. The invention defines a plurality of null regions which are substantially circular and defined via three axis centers at about 120 degrees rotated about a target location.

According to another aspect of the invention, non-linearity is used in the processing algorithm to separate reflected target area sounds. The intensity of the reflected target area sounds are estimated, band-by-band, such that all data, less than a predetermined threshold, is zeroed. Above the threshold, non-linear gain can be added to increase the significance of the noise present in the location. Hence, all reflected target area sound content may be removed from the blocking filter and all noise from other regions is increased. This results in a highly effective filter for all noise sources greater than the reflected target region sounds. Since human vocal cords emit sound at predictable frequencies, sound at these predictable frequencies can be used to further assure no speech content in the filter definition signal. A fundamental frequency range is determined and used to establish the frequencies where speech may be present, where frequencies in this range are removed from the blocking filter definition signal. Using an algorithm simulating an inverted pass, only these frequencies can also be used from sounds from the target area so that only speech frequencies are passed in the bands where only these vocal cord sounds are present.

According to another aspect of the invention, placement of three or more transducers on a common plane with the target areas is used to provide a unique microphone assembly. By aligning the plane with the target areas, an optimal directional advantage may be obtained using the microphone assembly. This aspect is particularly relevant in vehicles where the driver and passenger mouth locations tend to be on or near to a common plane with that of a vehicle accessory, such as a mirror surface.

According to yet another aspect of the invention, an algorithm is used with a vehicle accessory such that when speech follows predictable patterns, these patterns can be used to recognize speech elements partially lost. This enables the lost speech to be fully restored. Since vocal cord sounds are proceeded by and include extraneous sounds generally of a noise-like character, methods can be used to replace these partially lost sounds. By determining time varying aspects in time locations of the lost voice sounds, a reasonable estimation of the missing speech sounds can be made using digital signal processing techniques. Thus, the missing speech sounds can then be fully restored either substantially noise free or in the presence of average types of ambient noise. An example being the “S” and “SH” voice sounds, where both will occur in the same time locations but will have slightly different patterns. In using a specific algorithm, the missing bands can be re-created. Thus, this enables speech quality, as heard by a human or voice recognition system, to be a more complete and natural-sounding voice quality. These and other features, advantages, and objects of the present invention will be further understood and appreciated by those skilled in the art by reference to the following specification, claims, and appended drawings.

BRIEF DESCRIPTION OF THE DRAWINGS

The accompanying figures refer to identical or functionally similar elements throughout the separate views and which together with the detailed description below are incorporated in and form part of the specification, serve to further illustrate various embodiments and to explain various principles and advantages all in accordance with the present invention.

Figure 1:
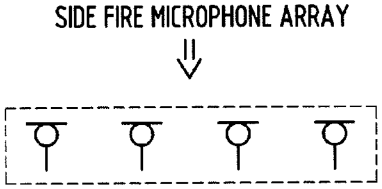
FIG. 1 PRIOR ART
FIG. 1 is a prior art diagram illustrating the configuration of a conventional side fire microphone array.
Figure 2:
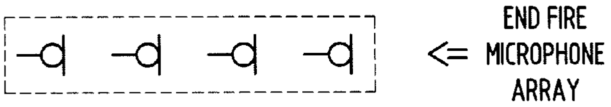
FIG. 2 PRIOR ART
FIG. 2 is a prior art diagram illustrating the configuration of a conventional end fire microphone array.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a planar microphone assembly. Accordingly, the apparatus, components, and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by “comprises . . . a” does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a planar microphone assembly as described herein. The non-processor circuits may include, but are not limited to, a radio receiver, a radio transmitter, signal drivers, clock circuits, power source circuits, and user input devices. As such, these functions may be interpreted as steps of a method to perform the composition and use of a planar microphone assembly for use as a vehicle accessory. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The microphone assemblies of the present invention are associated with an interior rearview mirror and have superior performance even in the presence of noise. The microphone assemblies enhance the performance of hands-free devices with which they are associated, including highly sensitive applications, such as voice recognition for a telecommunication system, by improving the signal-to-noise ratio of the microphone assembly output. The microphone assemblies eliminate mechanically induced noise and provide the designer with significant freedom with respect to selection of the microphone assembly’s sensitivity, frequency response, and polar pattern. Additionally, circuitry can be provided for the transducer to generate an audio signal from the transducer output that has a high signal-to-noise ratio.

Figure 3:
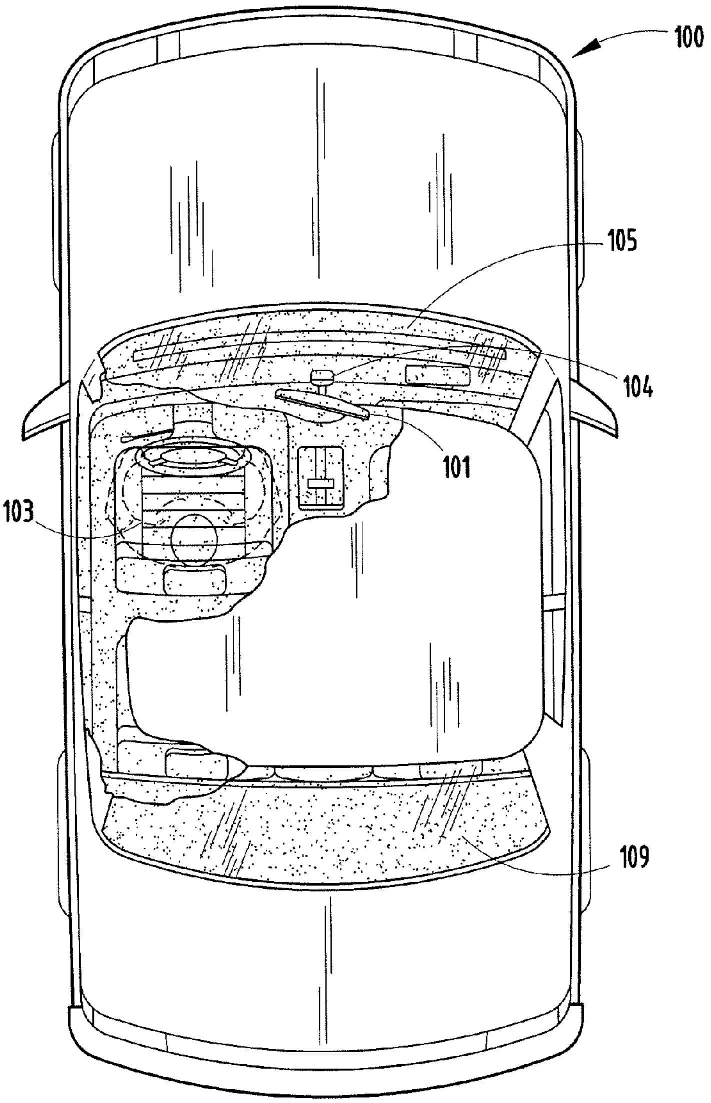
FIG. 3 is a top plan view of a vehicle with a portion of the roof cut away.

FIG. 3 is a top plan view of a vehicle with a portion of the roof cut away. The vehicle 100 includes an interior rearview mirror assembly 101 by which the vehicle operator 103 (illustrated in phantom) can view a portion of the road behind the vehicle 100 without having to turn around. The rearview mirror assembly 101 is mounted to the vehicle windshield 105, or the vehicle’s headliner, via a mirror mounting support 104, in a conventional manner that facilitates electrical connection of the rearview mirror to the vehicle's electrical system and permits driver adjustment of the mirror-viewing angle.

Figure 4:
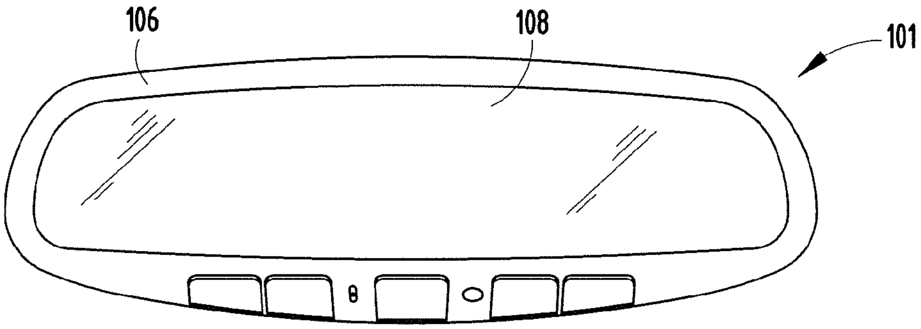
FIG. 4 is an elevational view of the front of a rearview mirror assembly incorporating a triangular microphone assembly in accordance with an embodiment of the present invention.

FIG. 4 illustrates an elevational view of the front of the rearview mirror assembly 101 incorporating a planar microphone assembly in accordance an embodiment of the present invention. The rearview mirror assembly 101 includes a mirror 108 mounted in an elongated mirror housing 106 pivotably carried on mirror support 104. The mirror 108 may be any conventional interior rearview mirror, such as a prismatic mirror of the type used with a mirror housing manually adjustable for daytime and nighttime operation or a multiple element mirror effecting automatic reflectivity adjustment, such as an electrooptic or electrochromic mirror. The elongated mirror housing 106 may be of any conventional manufacture, such as integrally molded plastic.

Figure 5:
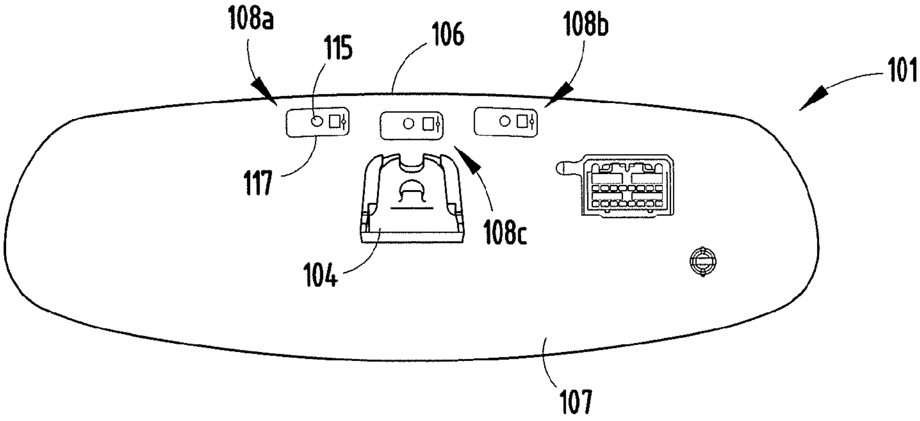
FIG. 5 is an elevational view of the rear of a rearview mirror assembly incorporating a triangular microphone assembly in accordance with an embodiment of the invention.

FIG. 5 is an elevational view of the rear of the rearview mirror assembly incorporating a planar microphone assembly in accordance with an embodiment of the invention. The microphone assembly 108*a*, 108*b*, and 108*c* are provided along the back surface 107 of mirror housing 106 (i.e., that surface facing forward of the vehicle). As apparent from FIG. 4, the microphone assemblies 108*a*, 108*b*, and 108*c* or their associated porting are not visible from the front of the mirror assembly and hence are generally not visible to the vehicle occupants. Those skilled in the art will recognize that the microphone assemblies 108*a*, 108*b*, and 108*c* may utilize either analog or digital microphones depending on specific application. Additionally, the microphone assemblies 108*a*, 108*b*, and 108*c* are also mounted on the back surface 107 of the mirror housing 106 and are not visible from the front of the mirror assembly.

The microphone assemblies 108*a*, 108*b*, and 108*c* are preferably mounted on the mirror assembly and may be substantially identical. Only one of the three microphone assemblies will be described herein. The microphone assembly 108*a* includes a transducer 115 and a circuit board 117. The microphone assembly 108*a* is generally rectangular, although the assembly could have a generally square footprint, an elongated elliptical, or rectangular footprint, or any other shape desired by the microphone designer. The microphone housing includes at least one port (FIG. 6) that faces upwards. These ports provide sound passages to the microphone assembly 108*a*. These ports can have any suitable opening shape or size. In the embodiment shown in FIG. 5, microphone assembly typically includes one port provided in the front surface (i.e., the side of the housing facing upward) of the mirror housing 106. Optionally, a plurality of additional rear ports (not shown) may be used in the rear surface (i.e., the side of the housing facing downward) of the mirror housing 106. The front and rear ports may be similar in shape and position and are preferably symmetrical. The microphone housing 215 can be integrally molded plastic, stamped metal, or of any other suitable manufacture.

The transducers 115 used in the microphone assemblies 108*a*, 108*b*, and 108*c* are preferably substantially identical. The transducers 115 can be any suitable, conventional transducers, such as electret, piezoelectric, or condenser transducers. The transducers may be, for example, electret transducers, such as those commercially available from Matsushita of America (doing business as Panasonic), and may advantageously be unidirectional transducers. If electret transducers are employed, the transducers can be suitably conditioned to better maintain transducer performance over the life of the microphone assemblies. For example, the diaphragms of the transducers 115 can be baked prior to assembly into the transducers.

The circuit board 117 has a conductive layer on one of its surfaces that is etched and electrically connected to the leads of transducer 115. The transducer leads may be connected to a pre-processing circuit that may be mounted to the conductive layer of circuit board 117. Alternatively, additional processing circuits may be located elsewhere in the vehicle, such as in the mirror assembly mount, an overhead console, audio head-unit, an on-window console, an A-pillar, or in other locations. Examples of such processing and pre-processing circuits are disclosed in commonly assigned U.S. Patent Application Publication No. 2002/0110256-A1 herein incorporated by reference.

The electrical connection of the transducer leads and the components of a pre-processing or other processing circuit are preferably by electrical traces in the conductive layer of the circuit board, formed by conventional means such as etching, and vias extending through the dielectric substrate of the printed circuit board. The circuit board may include holes for receipt of posts or other mounting devices. Such posts may be heat-staked to the circuit board substrate after the posts are inserted through the holes therein to secure the connection of the circuit board 117 to the microphone assembly 108*a* to ensure that the microphone assembly provides acoustically isolated sound channels between the transducer 115 and its associated ports.

To assemble the microphone assembly 108*a*, the transducer 115 is first mounted on the circuit board 117. As will be described in detail below, an acoustic dam/duct (not shown) maybe be inserted between the either transducer 115 or the microphone housing. The transducer 115, circuit board 117, are then secured to a housing forming the microphone assembly 108*a* with the acoustic dam/duct therebetween. Microphone transducers 115 are preferably mounted on the top of a printed circuit board assuring a common plane. The microphone assemblies 108*a*, 108*b*, and 108*c* may be generally constructed in the manner disclosed in U.S. Pat. Nos. 6,614,911, 6,882,734, 7,120,261 and U.S. Patent Application Publication No. 2004/0208334, which are all herein incorporated by reference.

Figure 6A:
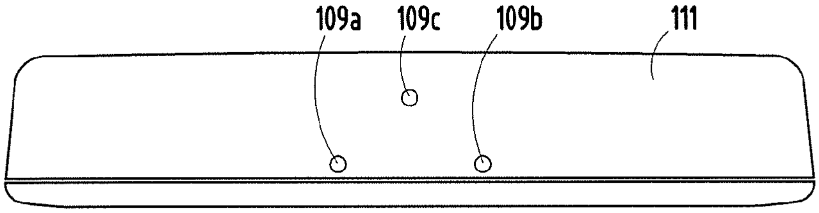
FIGS. 6A and 6B are plan views of the top and bottom, respectively, of the rearview mirror assembly incorporating a triangular microphone assembly in accordance with an embodiment of the present invention.
Figure 6B:
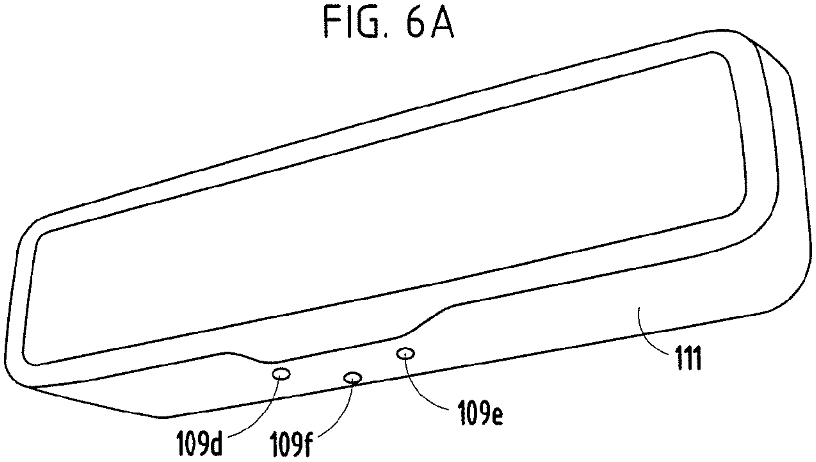

FIGS. 6A and 6B are plan views of the top and bottom of a rearview mirror assembly incorporating a microphone assembly in accordance with an embodiment of the present invention. In FIG. 6A, microphone ports 109*a*, 109*b*, and 109*c* are shown in a planar, substantially triangular configuration positioned at the top of mirror housing 111. The microphone ports 109*a*, 109*b*, and 109*c* are positioned in a common plane where the desired noise sources within the vehicle should all ideally lie in or near to this plane. For example, in the vehicle cab if the same-sized person were present in all seating positions, all speech locations would be in a common plane. Although each person may not be the same size or at the same elevation, these persons all lie close enough to a "common" plane such that the microphones would receive approximately the same amplitude of voice input. Ideally the microphone plane should be parallel and as close to this common plane as is feasible. Microphone spacing, as in any array, is a significant variable. The range for most audio applications ranges from 1.5 centimeters (cm) to 10.2 cm with the preferred distance being between 2.5 cm and 7.6 cm. In operation, the individual microphone assemblies 108*a*, 108*b*, and 108*c* may use rubber or other sealing systems to assure the transducer signals are received from the vehicle cab and not from within the mirror. In one embodiment, all three transducers would be mounted on a single printed circuit board (not shown) assuring the transducers all receive audile sound from a common plane. FIG. 6B is like that of FIG. 6A, wherein microphone parts 109*d*, 109*e*, and 109*f* are positioned in a substantially triangular configuration at the bottom of the mirror housing 111.

Figure 7A:
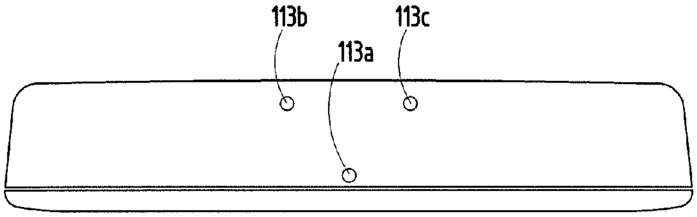
FIGS. 7A and 7B are plan views of the top and bottom, respectively, of the rearview mirror assembly incorporating a triangular microphone assembly in accordance with an alternative embodiment of the present invention.
Figure 7B:
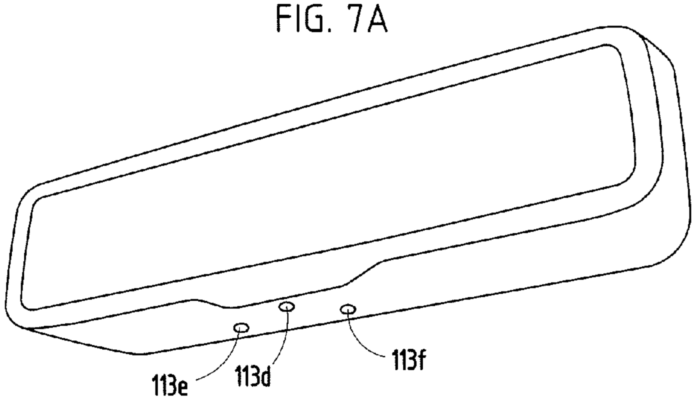

FIGS. 7A and 7B are plan views of the top and bottom of the rearview mirror assembly incorporating a microphone in accordance with an alternative embodiment of the present invention. In these embodiments, microphone ports 113*a*, 113*b*, and 113*c* are in a reverse planar configuration to that shown in FIG. 6A. Those skilled in the art will further recognize that due to the possible need for other non-related uses in the same physical space each transducer location may be independent from the others. Between these locations, switches, lights, and other functions part or separate from those of this system can be placed enabling features like lights and control switches to be located in the same location as the microphone system. As noted above, the present invention pertains to a vehicle rearview assembly that incorporates some or all of the components of a vehicle communication and control system. As used herein, a "earview assembly" is a structure that includes a rearward viewing device that provides an image of a scene to the rear of driver. FIG. 7B is like that shown in FIG. 7A where microphone parts 113*d*, 113*e*, and 113*f* are located on the bottom of the mirror housing in a reverse planar configuration to that shown in FIG. 6B.

As commonly implemented, such rearview assemblies include an appropriately positioned mirror element as the rearward viewing device. A rearward viewing device for a rearview assembly may additionally or alternatively include an electronic display that displays an image as sensed by a camera or other image sensor (see, for example, commonly assigned U.S. Pat. No. 6,550,949 entitled "SYSTEMS AND COMPONENTS FOR ENHANCING REAR VISION FROM A VEHICLE," filed on Sep. 15, 1998, by Frederick T. Bauer et al., the entire disclosure of which is incorporated herein by reference). Thus, a "rearview assembly" need not include a mirror element. In the embodiments described below, a rearview mirror assembly is shown and described. It will be appreciated, however, that such embodiments could be modified to include a display and no mirror element, or a display and mirror combined. Moreover, although not shown in any of FIG. 6A, 6B, 7A, or 7B, one or more of the microphone ports may be positioned on the front of the mirror housing, such as in a bezel, which might surround the mirror element. As will be apparent to those skilled in the art, certain aspects of the present invention may be implemented in vehicle accessories other than a rearview assembly, such as an overhead console, a visor, an A-pillar trim panel, an instrument panel, a headliner, etc. With respect to those implementations, the discussion below relating to rearview mirror assemblies is provided for purposes of example without otherwise limiting the scope of the invention to such rearview assemblies.

Figure 8:
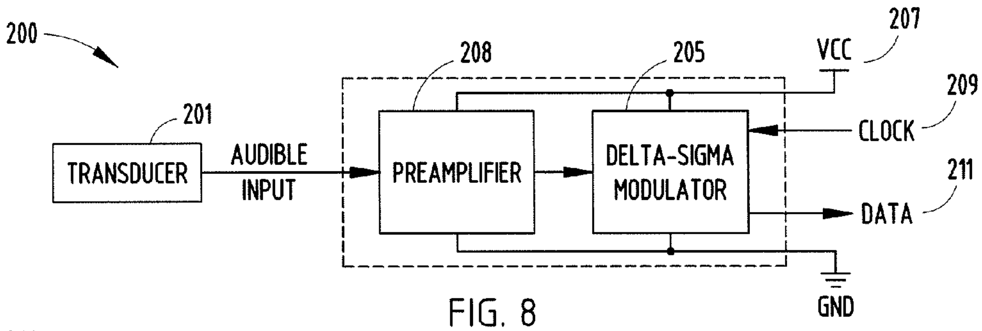
FIG. 8 is a block diagram illustrating a digital microphone for use in the triangular microphone assembly in accordance with an embodiment of the invention.

FIG. 8 is a block diagram of a digital microphone 200 as may be used in the triangular planar array as described herein. The digital microphone 200 includes a transducer 201 that supplies a low-voltage analog signal voltage to a preamplifier 203. The preamplifier 203 operates to increase the amplitude of the analog signal to a level adequate to supply an input to the delta-sigma modulator 205. A supply voltage 207 and clock signal 209 are typically supplied to the delta sigma modulator where a data output 211 supplies a 1-bit digital audio stream forming the basis of the "digital" microphone.

It should be further evident to those skilled in the art, that delta-sigma (ΔΣ) modulation is a form of analog-to-digital signal conversion derived from delta modulation. An analog to digital converter (ADC) circuit which implements this technique can be easily realized using low-cost complementary metal oxide semiconductor (CMOS) processes. Although delta-sigma modulation was first presented in the early 1960s, it is only in recent years that it has come into widespread use with improvements in silicon technology. The principle of the sigma-delta architecture is to make rough evaluations of the analog signal, to measure the error, mathematically integrate the error, and then compensate for that error. The mean output value is then equal to the mean input value if the integral of the error is finite. The number of integrators, and consequently, the numbers of feedback loops, indicates the "order" of a ΔΣ-modulator. Typically, first order modulators are stable, but higher order modulators may have issues with stability.

Figure 9:
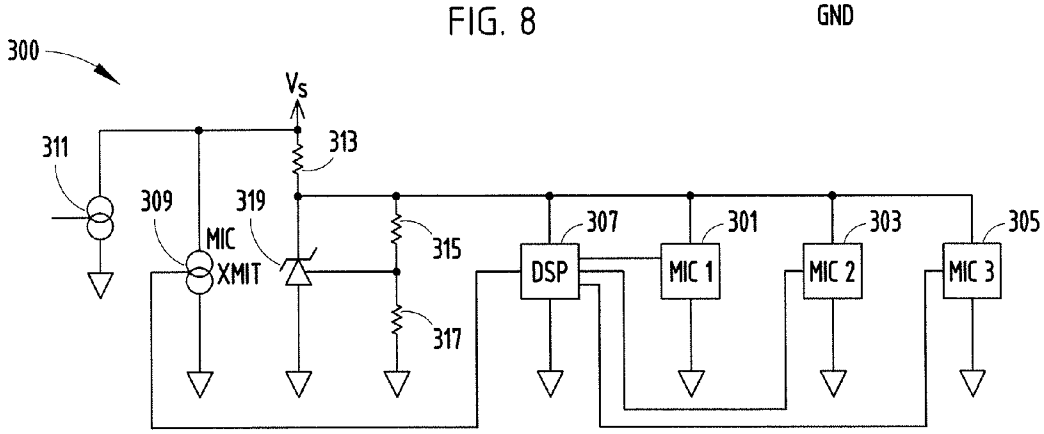
FIG. 9 is a block diagram illustrating the system topology for powering of the triangular microphone for use with a digital signal processor in accordance with the invention.

FIG. 9 illustrates a block diagram of the planar microphone array 300 as shown in FIGS. 5-7. The planar microphone array 300 includes a plurality of digital microphones 301, 303, 305 similar to those shown in FIG. 8. The output digital microphones 301, 303, 305 are supplied to a digital signal processor (DSP) 307 that works to digitally enhance the qualities of the digital signal dependent on the algorithm used. The output of the DSP 307 is supplied to switch 309 that outputs the digital signal to ground or a high-voltage relay 311. A supply voltage Vs is supplied at resistor 313 which provides a voltage to a supply network formed by resistor 315, 317 and zener diode 319. The resistor 315, 317 form a voltage divider circuit, while the zener diode 319 allows current to flow normally in a forward direction but also in the reverse direction if the voltage is larger than its rated breakdown voltage. The supply network may be configured to provide supply both an operating voltage and a clock signal to the DSP 309 as well as the digital microphones 301, 303, and 305 using a common bus line.

In one embodiment, the output of the digital microphone 301, 303, 305 may use Manchester encoding or utilize a run length limited (RLL) coding. These applications use a data communications line code in which each bit of data is signified by at least one voltage level transition. Thus, coding schemes, such as Manchester encoding, is considered to be self-clocking, meaning that accurate synchronization of a data stream is possible without use of a separate clock signal. Since each bit is transmitted over a predefined time period, asynchronous communication is possible with the DSP 307 and digital microphones 301, 303, 305. Alternatively, these components may also utilize a universal asynchronous receiver/transmitter (UART) device for converting bytes of data to and from asynchronous start-stop bit streams represented as binary electrical impulses.

In operation, there are many possible DSP algorithms for use in connection with the digital microphones 303, 305, 305 forming the triangular planar array. In one application, two reference signals may be created. One reference signal is substantially devoid of the desired sounds, and another as rich as possible with the desired sounds. The signal deficient of targeted speech is then used to create a software filter rejecting everything it contains, where the other reference signal is subjected to this software filter. Using this approach, the way these signals are created and the way residual targeted speech is removed from the noise filter signal are unique to rearview mirror vehicular applications. One method for creating these reference signals uses two microphone signals at one time in order to yield three unique combinations. The noise reference is created by nulling out the desired sounds in all three pairs then adding the three signals in pairs with additional phase shifting. This creates a plurality of nulled target sounds in the noise reference and maximum desired content in the source signal. In this way the desired sounds are as low as possible, and all noise sources, including out of plane noise sources, will be contained within this signal. It should be noted that any noise entering from far "off plane" will arrive nearly correlated and be subject to cancellation by the second processing cycle. In this way, all off plane sounds are treated as noise and rejected irrespective of their location.

Figure 10:
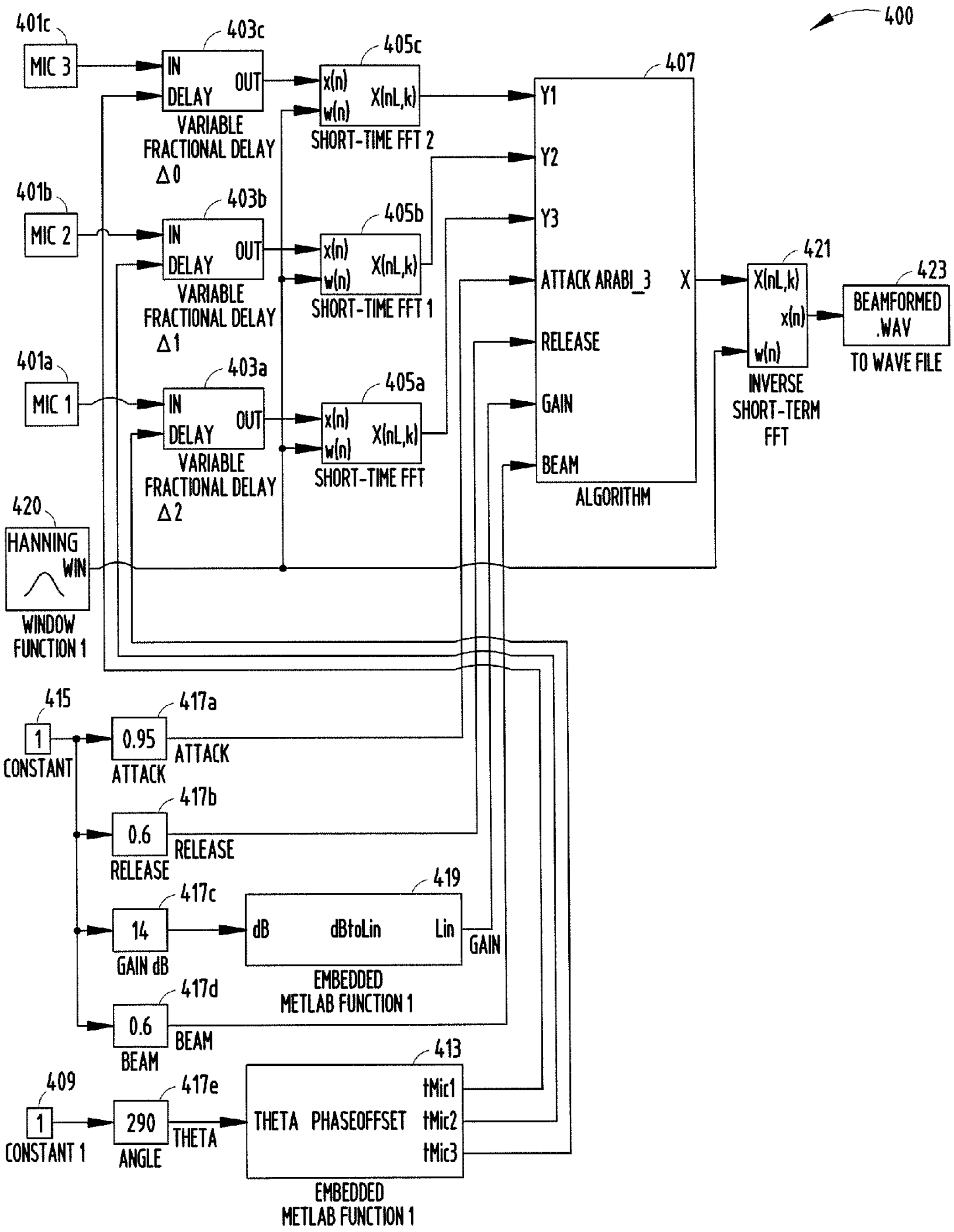
FIG. 10 is a block diagram of a three-dimensional array microphone using a DSP algorithm in accordance with an embodiment of the invention.

FIG. 10 is a block diagram of a three-dimensional microphone array using a digital signal processor (DSP) 400. It should be evident to those skilled in the art that although this embodiment is shown as a three-dimensional array, two or more microphones may be used in combination with the DSP in order to provide directivity. The three-dimensional microphone array using the DSP 400 includes microphones 401*a*, 401*b*, and 401*c*. The outputs of each microphone 401*a*, 401*b*, 401*c* provide analog outputs that are directed to corresponding variable fractional delay elements 403*a*, 403*b*, 403*c*. The output of each variable fractional delay element 403*a*, 403*b*, 403*c*, is directed to a short time fast Fourier transform (FFT) 405*a*, 405*b*, 405*c* along with a Hann window function 419. Each short time FFT 405*a*, 405*b*, 405*c* operates to convert its input signal to the frequency domain where each corresponding output Y1, Y2, Y3 is directed to an embedded DSP algorithm 407.

As seen in FIG. 10, the phase angle of each of the variable fractional delay elements 403*a*, 403*b*, 403*c* may be varied using a constant 409 to direct a specific phase angle (θ) 411, which may be offset using an embedded function 413. Each phase offset for microphone 401*a*, 401*b*, and 401*c* can then be varied using the variable fractional delay 403*a*, 403*b*, 403*c* at the output of each microphone. In order to further influence the embedded DSP algorithm 407, a constant 415 can be used to adjust the attack 417*a*, release 417*b*, and gain 417*c*, as well as the beam width 417*d* of each of the microphone signals. The gain 417*c* is supplied to the embedded DSP algorithm 407 along with the variable mathematical functions for attack 417*a*, release 417*b*, and beam width 417*d*. The output of the embedded DSP algorithm 407 is supplied to an inverse short time FFT 421 and vector scope 422 to be transformed back into the time domain. A boxcar-type window function is also applied to the input of the FFT 421. This beam-formed, time domain data is then supplied to an output 423 for providing a directional signal audio output signal from the three-dimensional microphone array 400.

Figure 11A:
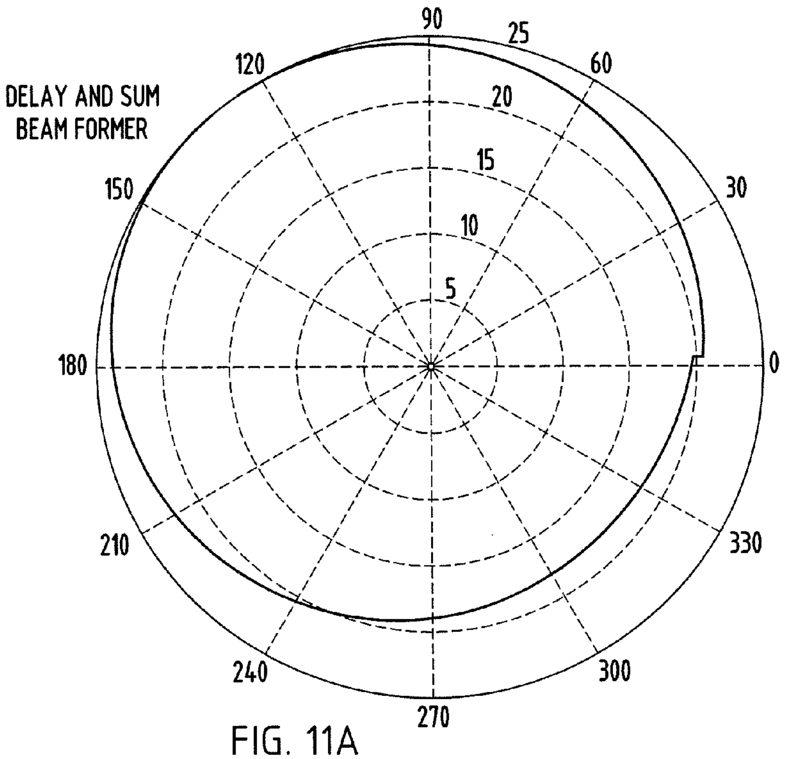
FIG. 11A is a polar diagram illustrating the directivity of a delay-and-sum beam-former.

Thus, FIG. 10 illustrates a conventional delay-and-sum beam-former that operates as a spatial filter for operating on the output of the array of microphones 401*a*, 401*b*, 401*c* in order to enhance the amplitude of a coherent signal relative to background noise and directional interference. This type of arrangement works to improve the signal-to-noise ratio (SNR). FIG. 11A illustrates a polar plot that shows the advantages of a typical beam-forming array. The beam-forming array utilizes microphones 401*a*, 401*b*, 401*c* along with corresponding delay elements 403*a*, 403*b*, 403*c* and corresponding short-time FFT elements 405*a*, 405*b*, 405*c*, which are all summed using an embedded DSP algorithm 407. Hence, the process of beam-forming works to concentrate the sounds coming from microphones 401*a*, 401*b*, 401*c* that might emanate from only one particular direction. As seen in FIG. 11A, this might look like a large lobe aimed in a direction of interest, such as 120°. This delay-and-sum beam-former implementation is based on the concept that the output of each microphone 401*a*, 401*b*, 401*c* will be equal, except that each of the outputs will be delayed by a different amount. If the output of each microphone 401*a*, 401*b*, 401*c* is delayed appropriately, then each output is added together to form a reinforcing signal. This has an overall effect of canceling noise coming from one or more of the microphones.

Figure 11B:
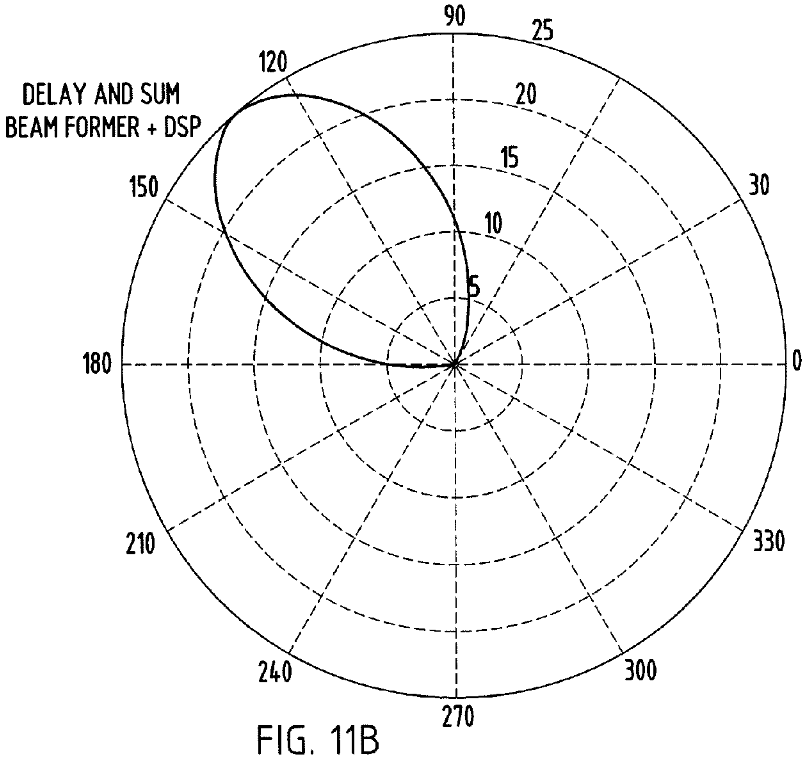
FIG. 11B is a polar diagram illustrating the directivity of a delay-and-sum beam-former in addition to using the DSP algorithm shown in FIG. 10.

Similarly, FIG. 11B illustrates a polar plot of a delay-and-sum beam-former microphone array using a DSP algorithm in accordance with an embodiment of the invention. In that the DSP algorithm can be further utilized to remove noise from the summed signal, this can further enhance the directional capabilities of the array. For example, the elimination of noise using the DSP algorithm, in FIG. 11B, the microphone array is pointed in a direction of approximately 130°, where the lobe is much narrower for eliminating sources of noise on either side of that beam heading.

The microphone algorithms used in the DSP algorithm 407 are derived from Aarabi's time difference of arrival (TDOA) methods, which are also known as phase-based speech processing. Those skilled in the art will recognize that Aarabi describes multi-microphone linear arrays, but does not specifically mention either two-dimensional or three-dimensional arrays. The approach used in the microphone array using the DSP algorithm 400 uses an SFFT to transform the multiple microphone signals 401*a*, 401*b*, 401*c* from the time domain into the frequency domain at each SFFT 405*a*, 405*b*, 405*c*. Once the signals are transformed into the frequency domain, their phase angles can be compared to determine if the signal in a given frequency band emanates from a desired direction. The desired phase difference is then computed based on the geometry of the source to the microphone locations. Based on how closely the calculated phase difference corresponds to the desired phase difference for a given audio frequency band, the gain for that band is then adjusted. A close match between calculated and desired phase differences results in gains close to unity or one. Various waiting functions can be used to calculate gain versus phase match. Typically, the calculated gain 417*c*, 419 is applied to one of the microphone signals resulting in a directional weighted signal. This weighted signal 403*a*, 403*b*, 403*c* is further processed in the frequency domain to perform stationary noise reduction, echo cancellation, speech recognition, as well as other functions. Alternatively, these weighted audio frequency bands can be recombined using an overlap add inverse SFFT to transform the signal back into the time domain.

In practice, a number of additional functions are required, which have a strong effect on system performance. These additional functions are combined with the embedded DSP algorithm 407 in order to enhance microphone directivity. These additional functions include:

(a) The desired phase difference may be adjusted to account for effects related to the microphone's acoustic environment;

(b) DC and low-frequency components which are not useful for speech recognition or telecommunications can easily be suppressed by multiplying the SFFT result by a frequency weighting vector;

(c) If band gains are permitted to change rapidly in time or frequency, severe distortion may result. The band gain vector is smoothed in the frequency domain using a finite impulse response (FIR) filter. This band gain vector is also smoothed in time. Those skilled in the art will recognize that this has been accomplished in the past using a first order IIR filter. There are significant performance advantages to using separate attack and release time constants 417*a*, 417*b* for the smoothing in the time function. Higher order smoothing with different attack and release characteristics can also be advantageous.

The fractional time delays can be used to adjust the microphone phase so that the average desired phase difference is zero. This has a number of distinct advantages since phase differences greater than plus or minus 180° are ambiguous and are required to be wrapped by minus or plus 360°. For example, a phase difference of 258° is equivalent to a difference of −2°. The use of this type of time delay allows larger microphone spacing (greater than 180°) to be used for a better low-frequency performance at the expense of additional side lobes in the directional response at high frequencies. In automotive applications, low-frequency noise is dominant, thus the signal-to-noise ratio (SNR) improvement that results from improved directionality at low frequencies from a larger spacing will outweigh the SNR loss from poor high-frequency directionality. Additionally, the time delayed signals can be summed to create a delay-and-sum beam-former. Thus, the gain calculated from the phase error can be applied to the delay in sum output 419 rather than using output from a single microphone to gain 3 decibels (dB) or more of additional directionality at higher frequencies.

To maintain constant beam versus frequency, the calculated phase errors need to be normalized to correspond to constant time of arrival error versus frequency. Additionally, a two microphone array has a single unique phase-error term; for a three microphone array, there are at least three unique phase-error terms. A four microphone array would have at least six unique phase-error terms. A five element array would have at least ten unique phase-error terms and a N element array will have N*(N−1)/2 unique error terms. These multiple error terms will be combined in order to arrive at an overall band gain. In the case of a three microphone array, the following equations represent several possible gain weighting functions, which are effective:

$$gain=1/(1+\gamma*PhaseError12^2)*1/(1+\gamma*PhaseError13^2)*1/*(1+\gamma*PhaseError23^2)$$

$$gain=1/(1+\gamma*(PhaseError12^2+PhaseError13^2+PhaseError23^2)^{0.5})$$

$$gain=1/(1+\gamma*PhaseError12^2)+1/(1+\gamma*PhaseError13^2)+1/(1+\gamma*Phase\ Error23^2)$$

(d) A beam with constant γ, larger values of γ will result in a narrower beam width and better noise rejection, but will also result in higher distortion. In situations where the microphone array has more than three elements, some of these error terms may be eliminated from the gain calculation in order to reduce computational load at the expense of some loss in directionality. Since limiting the maximum gain reduction can reduce distortion, this can be implemented using a conditional function or by adding a minimal gain constant to the gain expression in order to prevent the gain from reaching zero.

A two microphone array provides good directivity in an end-fire arrangement. However, this does require mechanical aiming. Thus, the two microphone array has a very limited ability to be aimed through software as compared with the three microphone array using the DSP algorithm 400 illustrated in FIG. 10. This type of array has 360° aiming flexibility. The aim angle can be adjusted statically to calibrate the microphone for different vehicles or adjusted dynamically to track motion of the occupants. Although the microphone triangle need not be equilateral, placing two of the microphones forward and closest to the driver of the vehicle will give an optimal performance. Arranging the microphone triangle such that the driver and passenger are both in a properly mechanically-aimed end-fire configuration with a rear microphone common to both end-fire arrays also is a good option in that it gives a good deal of directionality with reduced computational load required by the embedded DSP algorithm 407. Multiple aim directions can be calculated for a three or more element directional array such that the driver and passenger can both be calculated simultaneously.

Both of the signals might be directed through a noise gate (not shown) where the results are then summed to provide automatic talk or selection. In situations where digital microphones are used, which often use a delta sigma modulation scheme, the bit stream output of the individual microphone delays can be simply implemented by bit delays to avoid fractional delay computations. Further, in situations where biased capacitor microphones are used, these types of devices can generate excess noise if exposed to moisture and high humidity. Many silicon microphones are the biased capacitor type. If the DSP, its voltage regulator, or other heat-generating components are located within the microphone array, this heat source or sources can be used to keep the microphones substantially dry and quiet. Hydrophobic material, such as treated cloth, can also be used to cover microphone parts in order to provide acoustic protection from flowing air and to exclude liquid or water.

Those skilled in the art will also recognize that flowing air arriving at the same instant as the desired audible tones also cancels for this condition. Thus, it is desirable to have the worst case flowing air arrive perpendicular to the microphone plane and conversely avoid situations where high flow along the plane is likely. In a mirror application this condition is best achieved on the bottom of the mirror housing 111. This is contrary from current best practices since in this approach any reflected target area energy is unwanted, rather than as additional desired energy. Moreover, at the bottom of the mirror housing a balanced air flow strike is the most likely scenario.

In situations where flowing air is an issue, if barriers are used, any flowing air excitation can be lowered as long as the acoustic impact of these barriers can be compensated. Cloth can be used as such a barrier. All three microphones can be placed under a common cloth protected volume as a means to lower flowing air induced final signals by assuring better balanced excitation. A critical aspect is the way the signals are assured to be correctly nulled. In this case, it is first assured by direct acoustic calibration. This way, all variations, such as transducer sensitivity and response differences, are corrected. Operation of this system is automatically recalibrated during low noise times where the acoustic factors are dominant. In this case, the nulls are fine-tuned and a threshold value is determined where there is no residual target area energy in the blocking filter signal. One way of determining the threshold value is by slowly changing the value under low noise conditions and then determining when speech is impacted by the noise filter. It is important that all relative target area sounds are retained using this process so that the filter is always set for the most effective noise processing when needed. Even in the most challenging vehicle where a lot of noise is involved, there will be periods of use in low noise conditions.

A significant advantage that this approach has over current systems is it is always processing and keeps an updated set of values in a memory, like flash or EEPROM (not shown), that assures it is always ready to optimally process audio. It need not quickly adjust upon each use as is now the typical case. It is possible for this approach to interpret events both preceding activation and after it is completed. This allows calibration during low noise and times of no use. Since it is an intelligent system, it might ask the user to speak to aid calibration in non-use times. A logical time being upon starting the vehicle where a brief statement would be used to assure the targeting and calibration.

Figure 12A:
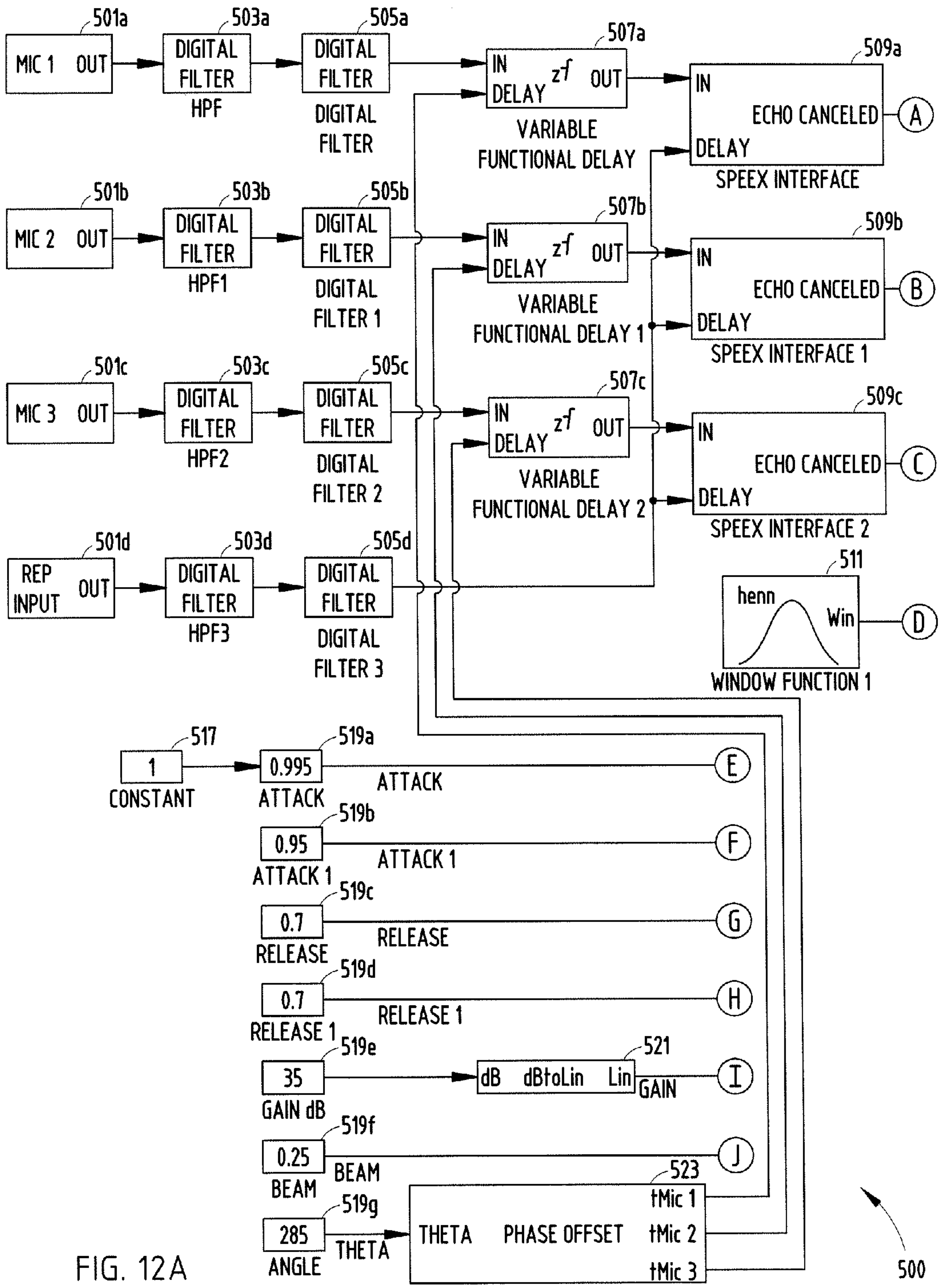
FIGS. 12A and 12B are block diagrams illustrating the system topology for powering of the triangular microphone for use with a digital signal processor in accordance with the invention.
Figure 12B:
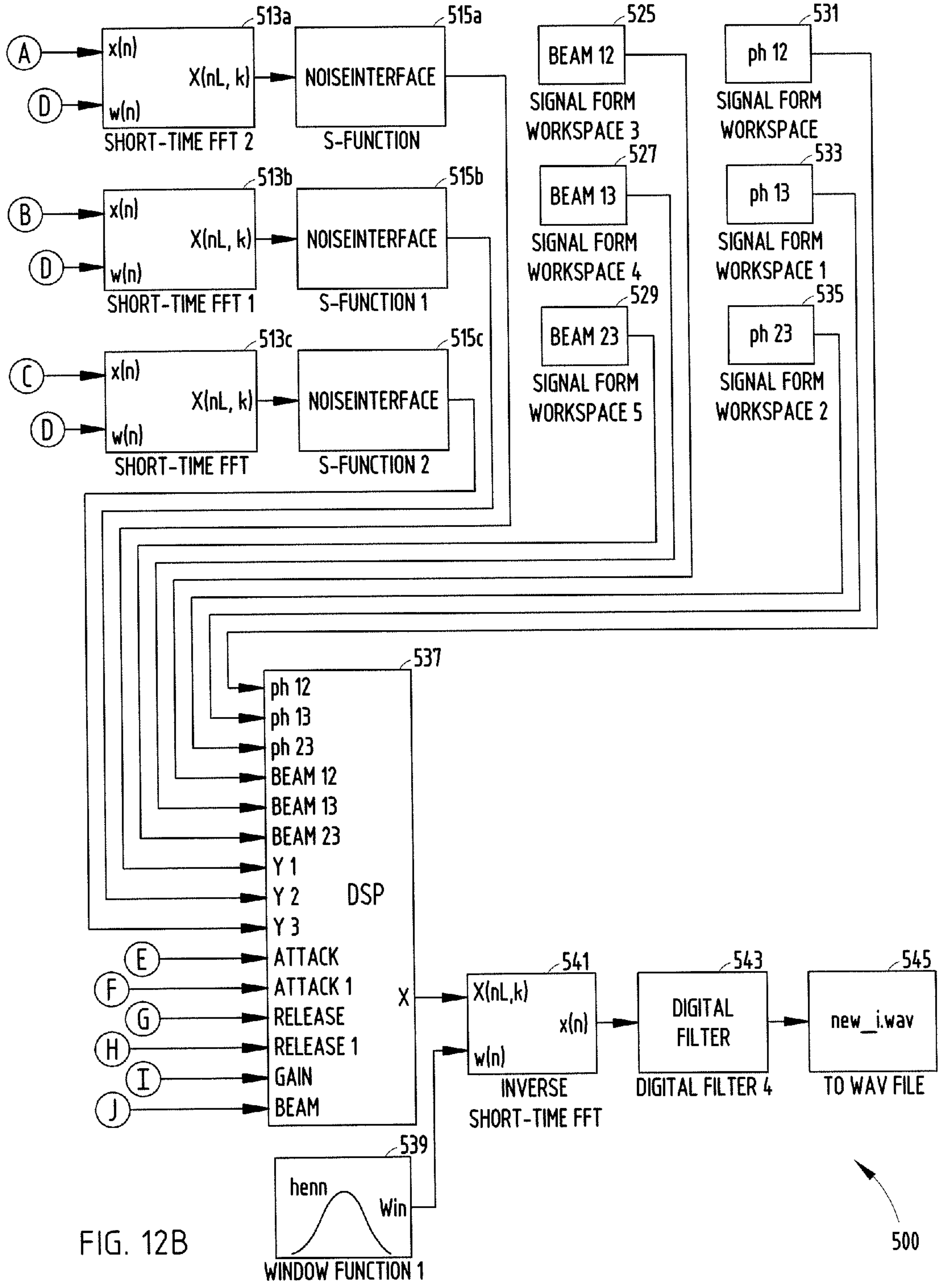

FIGS. 12A and 12B are a block diagrams illustrating a system topology for the triangular microphone for use with a digital signal processor in accordance with an alternative embodiment to that shown in FIG. 10, in that the microphone array as described herein has a constant time delay relationship between the microphones as the time delays are fixed by geometry. The phase difference between microphones is proportional to both time delay and frequency. Without normalization, the beamwidth becomes narrower with increasing frequency; normalizing by (1/f or f^-1.0), gives constant beamwidth versus frequency but can result in excessive high frequency gain in vehicle. Using a fractional power (e.g. f^-0.76) normalization can reduce the excess high frequency gain while preserving the signal-to-noise advantage of normalization. The particular value of the exponent can be selected to give the best tradeoff between beamwidth, signal-to-noise ratio, and frequency response. Moreover, the phase error is affected by acoustic parameters of the microphone housing; therefore, the phase error deviates from the phase prediction based on time delay alone. A correction vector based on measured phase can be added to cancel the non-ideal phase error due to the acoustic environment.

The phase based microphone array system with fractional power phase normalization 500 operates to provide both pre-emphasis and de-emphasis of predetermined microphone frequencies as well as echo cancellation, stationary noise reduction, and directionality for the microphone array. As noted above, microphones 501*a*, 501*b*, 501*c* may typically be positioned within a vehicular rearview mirror. The microphones 501*a*, 501*b*, and 501*c* provide outputs that are directed to filters 503*a*, 503*b*, 503*c*, respectively, which are 6th order Chebyshev high pass filters. A far-end reference signal input 501*d* is provided for canceling a voice or other audio that emanates from a vehicular speaker located within the vehicle. The output of the far-end reference signal is also provided to a corresponding high-pass filter 503*d*. Each of the filters 503*a*, 503*b*, 503*c*, and 503*d* have an approximate cutoff frequency of 300 Hz for eliminating vehicle noise and other unwanted audio within the interior of the vehicle.

The output of the high-pass filters 503*a*, 503*b*, 503*c*, 503*d* is presented to the subsequent pre-emphasis filters 505*a*, 505*b*, 505*c*, and 505*d* to "whiten" the spectrum from each microphone. "Whitening" the audio spectrum is done to improve convergence of the echo canceller as well as to reduce roundoff errors and signal processing artifacts. The typical audio spectrum from the microphones has most of its energy concentrated at low frequencies. The "whitening" filter is typically a first order high-pass filter with a corner frequency in the range of 50-500 Hz. The result of the high-pass filtering operation is to produce an output spectrum with approximately flat energy versus frequency. The outputs of the pre-emphasis filters 505*a*, 505*b*, 505*c*, and 505*d* are provided to corresponding fractional delay elements 507*a*, 507*b*, 507*c*, 507*d* along with phase correction functions for providing a predetermined amount of delay to allow all of the respective signals from microphones 501*a*, 501*b*, 501*c* to be presented to a corresponding echo cancellers 509*a*, 509*b*, 509*c* with substantially zero phase angle between signals from the desired direction. As noted in FIG. 12A, each phase offset for microphone 501*a*, 501*b*, and 501*c* can then be varied using the time delay functions 519*g*/523) at the input to fractional delay elements 507*a*, 507*b*, and 507*c*. A beam width adjustment 519*f* and angle 519*g*/523 are used for beam width and aim direction for the microphone array 501*a*, 501*b*, and 501*c*.

The output from the pre-emphasis filter 505*d* is included as an input to each echo canceller 509*a*, 509*b*, 509*c* in order to provide cancellation for this undesired audio component.

This operates to effectively cancel the far-end reference signal as audio entering microphones 501*a*, 501*b*, and 501*c*. The output of each echo canceller 509*a*, 509*b*, 509*c* is applied to a corresponding fast Fourier transform (FFT) 513*a*, 513*b*, 513*a* along with a Hann window function 511 to convert the time-domain signals from each respective echo canceller 509*a*, 509*b*, 509*c* into audio segments in the frequency domain. The output of each of the respective FFTs 513*a*, 513*b*, 513*c* is then input into the stationary noise reduction functions. The outputs of each of the stationary noise reduction functions 515*a*, 515*b*, 515*c* are then input to a phase based noise reduction function 537 for directional discrimination and additional noise reduction. The phase center and width tables 525, 527, 529, 531, 533, and 535 are used as an input the DSP algorithm 537 to compensate for phase deviations that cannot be accounted for in the fractional delays, such as acoustic effects due to the mirror housing. The output of algorithm 537 is provided to an inverse FFT 541 where in combination a Hann window 539 works to convert the signal back to the time domain. Filter 543 further provides a de-emphasis function to give the overall system a flat frequency response in the 300-4000 Hz range and for reducing any unwanted digital processing anomalies in the final signal that is presented at output 545.

Figure 13:
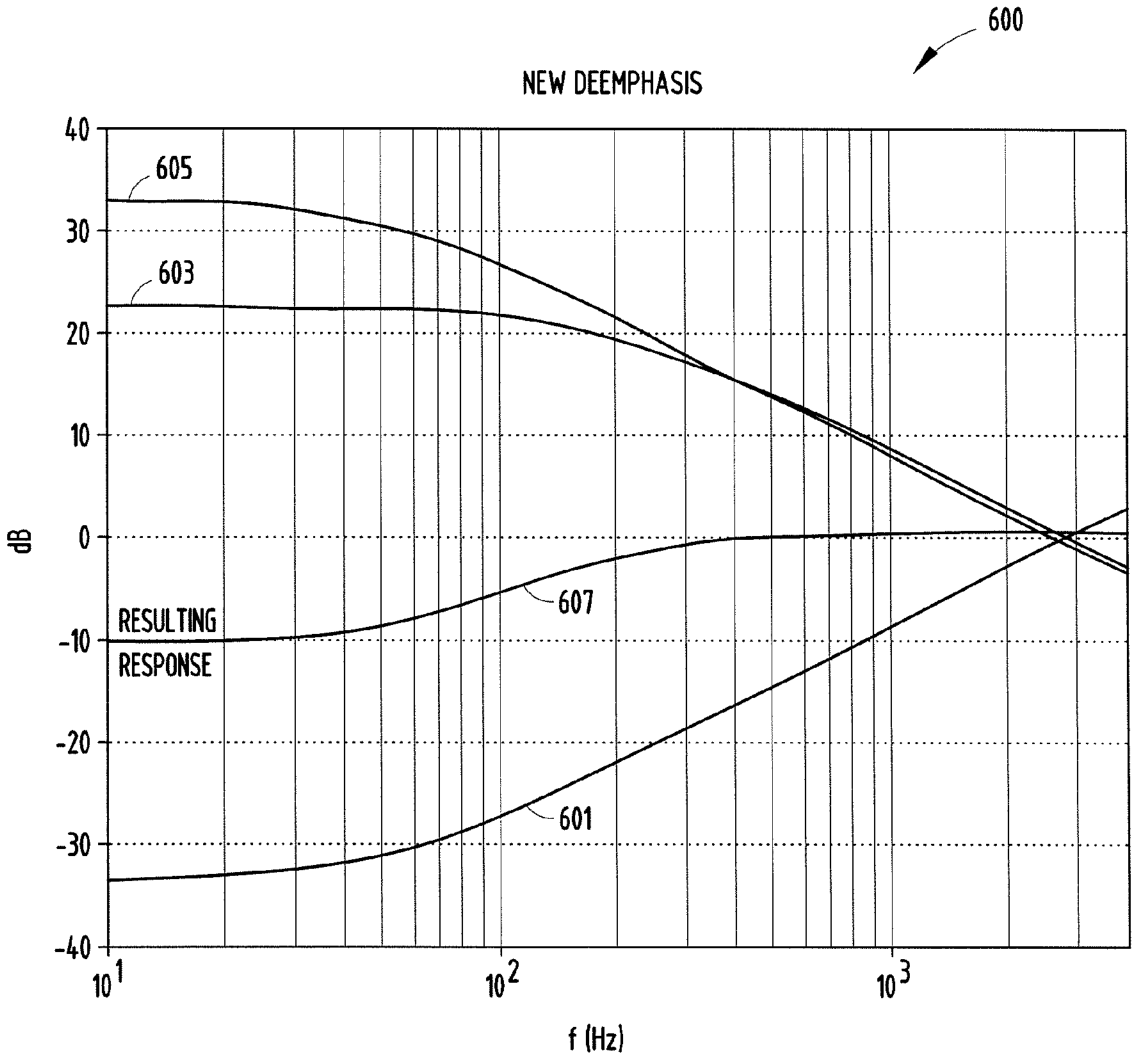
FIG. 13 illustrates a graph of the amplitude versus frequency of the output of the phase based microphone array with fractional power phase normalization as shown in FIGS. 12A and 12B.

FIG. 13 illustrates a graph of the amplitude versus frequency of the output of the phase based microphone array with fractional power phase normalization as shown in FIG. 12. The X axis shows a logarithmic representation of frequency from 10/4000 Hz while the Y axis represents the magnitude in dB. The line 601 illustrates the frequency response of the pre-emphasis high pass filters 505*a*, 505*b*, 505*c*, and 505*d* whose amplitude rises with frequency. The line 603 illustrates the frequency response of the improved de-emphasis block 543 in FIG. 12. The line 607 illustrates the resulting response which is approximately flat from approximately 300-4000 Hz. The line 605 represents a conventional de-emphasis function which is exactly complementary to the pre-emphasis function 601.

Figure 14:
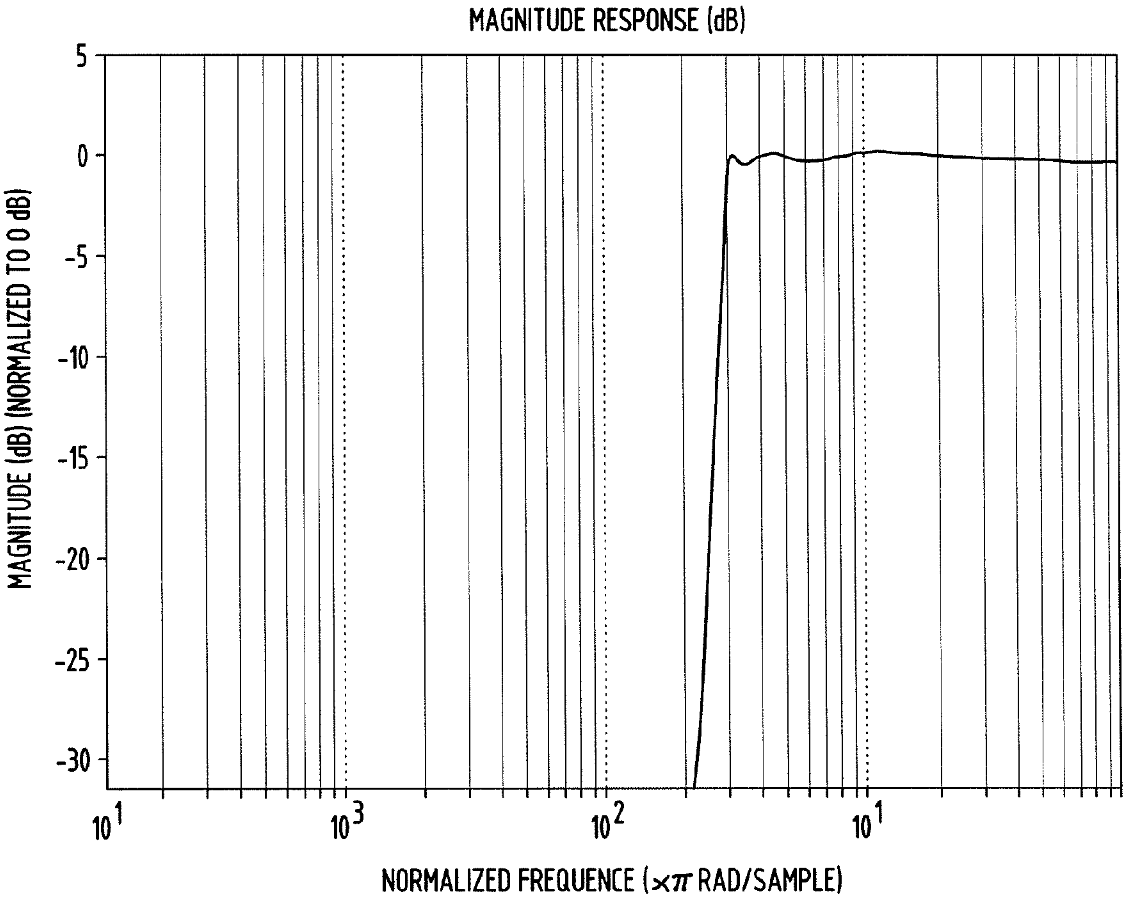
FIG. 14 is a graph illustrating the normalized magnitude versus the normalized frequency of the high pass filter as shown in FIGS. 12A and 12B.

FIG. 14 is a graph illustrating the normalized magnitude versus the normalized frequency of the high pass filter as shown in FIG. 12. The graph illustrates a cutoff frequency of approximately 300 Hz where the magnitude of the signals from microphones 501*a*, 501*b*, 501*c*, and the far-end reference signal 501*d* are essentially eliminated below the frequency. This enables mechanical noise and other undesired audio components to be reduced, as much of this type noise is at 300 Hz or below.

Figure 15A:
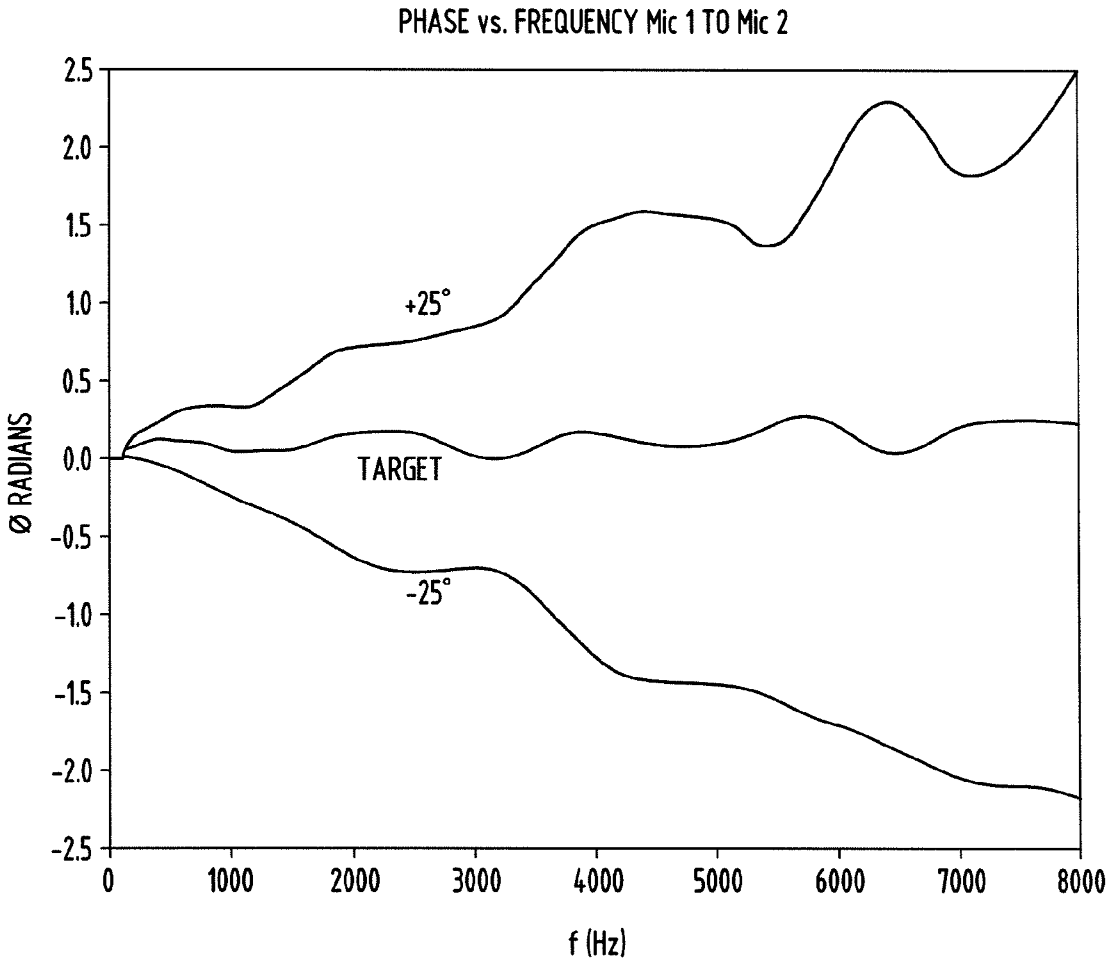
FIGS. 15A, 15B, 15C are graphical representations of phase versus frequency for MIC 1 to MIC 2, MIC 1 to MIC 3, and MIC 2 to MIC 3, respectively, as shown in FIGS. 12A and 12B.
Figure 15B:
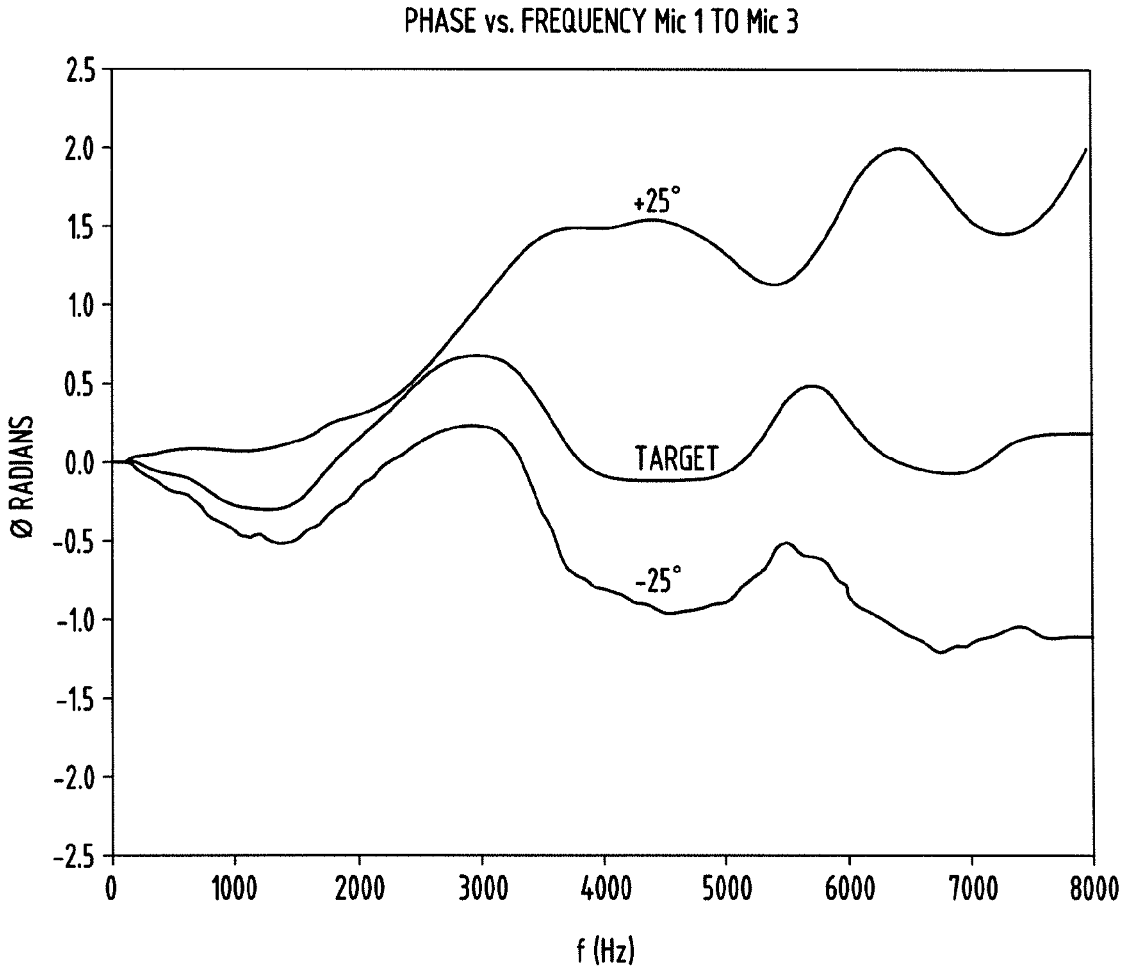
Figure 15C:
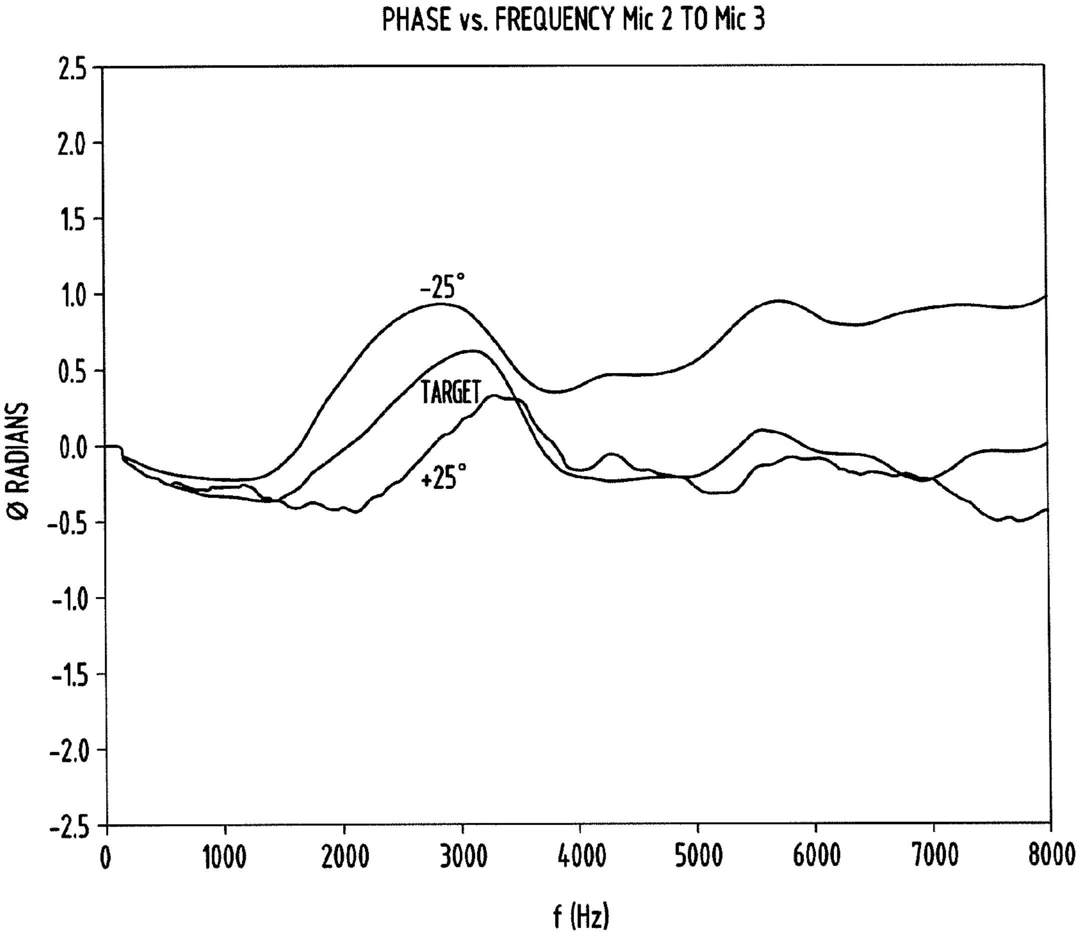

FIGS. 15A, 15B, 15C are graphical representations of phase versus frequency for MIC 1 to MIC 2, MIC 1 to MIC 3, and MIC 2 to MIC 3, respectively. Each of the graphs illustrates the phase difference for a 25° beam width between signals received between the microphones and a target phase difference. As seen in FIG. 15A, the phase versus frequency difference between MIC 1 and MIC 2 is essentially flat over the spectrum from 0 to 8000 Hz at an aim angle of 0° (target), while with a ±25° aim angle the phase difference increases and/or decreases with frequency. FIG. 15B illustrates the phase versus frequency difference between MIC 1 and MIC 3 at an aim angle of 0° (target), while with a ±25° aim angle, the phase difference again increases and/or decreases with frequency. The phase versus frequency characteristic is more irregular between MIC 1 and MIC 3 than between MIC 1 and MIC 2. FIG. 15C illustrates the phase versus frequency difference between MIC 2 and MIC 3 at an aim angle of 0° (target), while with a ±25° aim angle, the phase difference again increases and/or decreases with frequency. The phase versus frequency characteristic is yet more irregular between MIC 2 and MIC 3 than between MIC 1 and MIC 2. FIG. 15C also serves to illustrate why it is advantageous to store the phase corrections as a center and a width.

In some areas of FIG. 15C, the phase characteristics are anomalous due to the acoustic environment, such as between 3000-4000 Hz. The most critical characteristic is to pass on axis (target) signals. The phase difference between the ±25° aim angles is stored so that in areas where the direction of phase change is anomalous, the result will be a wider beam width rather than a loss of the desired signal. The conventional pre-emphasis transfer function is represented in Equation 1:

$$P(z)=1-\alpha*z^{-1}. \quad \text{Eq. 1}$$

Similarly, the conventional de-emphasis transfer function is represented in Equation 2:

$$D(z)=1/(1-\alpha*z^{-1}) \quad \text{Eq. 2}$$

The improved de-emphasis transfer function is represented in Equation 3:

$$D(z)=1/(1-\alpha*z^{-1}+\beta*z^{-2}) \quad \text{Eq. 3}$$

where z is complex frequency and α is the filter coefficient that sets the corner frequency of the pre-emphasis/de-emphasis transfer function; β is a filter coefficient that controls the low frequency shelf on the improved de-emphasis transfer function; and α can be calculated from the following Equatoin 4:

$$\alpha=e^{-(2*\pi*fc)/fs} \quad \text{Eq. 4}$$

where fc is the desired cutoff frequency in Hz; fs is the sampling frequency in Hz and β is chosen to introduce a shelf in the improved de-emphasis function 603 below the lowest frequency of interest (about 200 Hz in FIG. 13). As illustrated in FIG. 13, fc=55 Hz, fs=16000 Hz, α=0.9787 and β=0.05.

Thus, the invention defines a new digital microphone system that includes a plurality of digital microphones each having a digital output signal such that a digital signal processor (DSP) is used for receiving each digital output signal and providing a processed digital output signal. Each of the plurality of digital microphones are phase normalized as a function of the audio frequency received at the digital microphones. Thus, microphone signals are processed using a threshold value by frequency band. Any magnitude below the threshold is zeroed for creating a digital clipping approach above predetermined thresholds where gain is added to expand and equalize the lower noise magnitudes up away from the threshold. The three resulting speech null signals are added to form a noise reference signal with minimal target area content. The zeroed bands will contain negligible speech no matter the phase in view of the removal of the noise content. The final result is a noise reference signal devoid of all speech and containing a maximum amount of noise sources, no matter where located or what type as long as they are different enough in the processing to be on the passed side of at least one of the three sub signals. The threshold value used is not fixed, but adaptive and updated during periods of relatively low noise, using the change in output as a means of determining when speech content is present. During quiet moments, all output is assumed to be a desired target sound. Thus, the goal can be achieved by eliminating target region sounds from the signal used to build the blocking filter but includes at full significance all other signals so they are blocked by the resulting filter.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed:

1. A digital microphone system comprising:

a plurality of digital microphones each having a digital output signal;

a digital signal processor (DSP) for receiving each digital output signal and providing a processed digital output signal; and wherein each of the plurality of digital microphones are phase normalized as a function of the audio frequency received at the digital microphones.

2. A digital microphone system as in claim 1, wherein the plurality of digital microphones operate as a delay-and-sum beam-former microphone array in connection with the DSP.

3. A digital microphone system as in claim 2, wherein the delay-and-sum beam-former microphone array utilizes parameterizing phase correction for orienting a beam center and beam width.

4. A digital microphone system as in claim 1, wherein the plurality of digital microphones utilize a gain smoothing time function having a plurality of attack and release constants for providing directional characteristics.

5. A digital microphone system as in claim 4, wherein the plurality of attack and release characteristics operate as a phase based gain adjustment.

6. A digital microphone system as in claim 1, wherein each of the plurality of digital microphones include a transducer, a preamplifier, and a sigma delta modulator.

7. A digital microphone system as in claim 1, wherein the DSP provides a de-emphasis of predetermined frequency bands without increasing the amplitude of unwanted frequency bands.

8. A vehicular audio signal processing system for use with electronic devices comprising:

a plurality of digital microphones providing a plurality of signals;

a digital signal processor (DSP) using at least one non-linear process for processing the plurality of signals; and wherein the non-linear process provides phase correction as a function of frequency input into the plurality of digital microphones for accounting for non-ideal phase characteristics of the audio received at the plurality of digital microphones.

9. A vehicular audio signal processing system as in claim 8, wherein the DSP forms three directional patterns having common null locations for defining a unique spatial location.

10. A vehicular audio signal processing system as in claim 8, wherein the DSP forms three directional patterns having different central axes for defining a unique spatial location.

11. A vehicular audio signal processing system as in claim 8, wherein the DSP utilizes parameterizing phase correction for orienting a microphone beam center and microphone beam width.

12. A vehicular audio signal processing system as in claim 8, wherein the plurality of digital microphones operate as a delay-and-sum beam-former microphone array.

13. A vehicular audio signal processing system as in claim 8, wherein the plurality of digital microphones utilize a gain smoothing time function having a plurality of attack and release constants for providing directional characteristics.

14. A vehicular audio signal processing system as in claim 13, wherein the plurality of attack and release characteristics operate as a phase based gain adjustment.

15. A vehicular audio signal processing system as in claim 8, wherein the DSP provides a de-emphasis of predetermined frequency bands without increasing the amplitude of unwanted frequency bands.

16. A microphone assembly for use in a vehicle comprising:

a rearview mirror housing adapted for attachment to the interior of the vehicle, the rearview mirror housing having a back surface generally facing the front of the vehicle and an opening generally facing the rear of the vehicle;

a mirror disposed in the opening of the mirror housing;

a plurality of microphone transducers arranged in a substantially triangular configuration in the mirror housing to form a microphone array; and wherein each of the plurality of digital microphones are phase normalized as a function of the audio frequency received at the digital microphones for use with a digital signal processor (DSP).

17. A microphone assembly as in claim 16, wherein the attack, release, gain, and beam width of the microphone array can be adjusted.

18. A microphone assembly as in claim 16, wherein the microphone array is formed into a triangular configuration.

19. A microphone assembly as in claim 16, wherein the plurality of microphone transducers utilize a gain smoothing time function having a plurality of attack and release constants for providing directional characteristics.

20. A microphone assembly as in claim 19, wherein the plurality of attack and release constants operate to provide a phase based gain adjustment.

21. A microphone assembly as in claim 16, wherein the DSP provides a de-emphasis of predetermined frequency bands without increasing the amplitude of unwanted frequency bands.

22. A triangular microphone assembly for use in a vehicle accessory comprising:

a mirror housing adapted for attachment to the interior of the vehicle;

a mirror disposed in an opening of the mirror housing;

a plurality of virtual digital microphones arranged in a substantially triangular configuration in the mirror housing;

a digital signal processor (DSP) for receiving signals from the plurality of digital microphones; and wherein the digital microphones exhibit directional characteristics for reducing undesirable noise in at least one direction by normalizing the phase of the received signals as a function of signal frequency.

23. A triangular microphone assembly as in claim 22, the plurality of digital microphones each include a transducer, preamplifier, and delta sigma modulator.

24. A triangular microphone assembly as in claim 22, wherein the plurality of virtual digital microphones operate as a delay-and-sum beam-former microphone array.

25. A triangular microphone assembly as in claim 22, wherein the plurality of virtual microphone transducers utilize a gain smoothing time function having a plurality of attack and release constants for providing directional characteristics.

26. A triangular microphone assembly as in claim 25, wherein the plurality of attack and release characteristics operate as a phase based gain adjustment.

27. A triangular microphone assembly as in claim 22, wherein the DSP provides a de-emphasis of predetermined frequency bands without increasing the amplitude of unwanted frequency bands.

* * * * *